(12) United States Patent
Kim et al.

(10) Patent No.: US 8,273,480 B2
(45) Date of Patent: Sep. 25, 2012

(54) NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(75) Inventors: Jun-Sik Kim, Suwon-si (KR); Eui-Hwan Song, Suwon-si (KR); Kyeu-Yoon Sheem, Suwon-si (KR); Yong-Chul Park, Suwon-si (KR); Jin-Kyu Hong, Suwon-si (KR); Man-Seok Han, Suwon-si (KR); Tae-Keun Kim, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 251 days.

(21) Appl. No.: 12/461,769

(22) Filed: Aug. 24, 2009

(65) Prior Publication Data

US 2010/0178560 A1    Jul. 15, 2010

(30) Foreign Application Priority Data

Jan. 15, 2009    (KR) .......................... 10-2009-0003505

(51) Int. Cl.
*H01M 4/48*     (2010.01)
*H01M 4/13*     (2010.01)
*H01M 4/88*     (2006.01)
*H01B 1/06*     (2006.01)
*H01B 1/02*     (2006.01)

(52) U.S. Cl. ............... 429/231.1; 429/218.1; 252/182.1; 252/507; 252/520.21

(58) Field of Classification Search ............... 429/218.1, 429/231.1; 252/182.1, 507, 520.21
See application file for complete search history.

(56) References Cited

U.S. PATENT DOCUMENTS 5,545,468 A    8/1996   Koshiba et al.
6,475,673 B1   11/2002  Yamawaki et al.
(Continued)

FOREIGN PATENT DOCUMENTS

JP     2000-302547    10/2000
(Continued)

OTHER PUBLICATIONS

Gao, Jian, Changyin Jiang, Jierong Ying and Chunrong Wan. "Preparation and characterization of high-density spherical Li4Ti5O12 anode material for lithium secondarybatteries", Journal of Power Sources. vol. 155 (2006), Issue 2, pp. 364-367.*

(Continued)

*Primary Examiner* — Karie O'Neill Apicella
(74) *Attorney, Agent, or Firm* — Robert E. Bushnell, Esq.

(57) ABSTRACT

A negative active material for a rechargeable lithium battery, a method of preparing the negative active material, and a rechargeable lithium battery including the negative active material. The negative active material for a rechargeable lithium battery includes lithium titanium oxide ($Li_4Ti_5O_{12}$) having a tap density of about 1.2 g/cc to 2.2 g/cc. The lithium titanium oxide is prepared by a mechano-chemical treatment and a heat treatment at a low temperature of about 650° C. to 775° C. According to the present invention, lithium titanium oxide having high crystallinity and tap density can be prepared through a simple and low-cost solid-phase method, e.g., a mechano-chemical treatment, and thus an electrode with excellent electrochemical reactivity and high energy density per volume can be fabricated.

21 Claims, 6 Drawing Sheets

U.S. PATENT DOCUMENTS

| | | | |
|---|---|---|---|
| 6,645,673 B2 | 11/2003 | Yamawaki et al. | |
| 6,890,510 B2* | 5/2005 | Spitler et al. | 423/598 |
| 7,211,350 B2* | 5/2007 | Amatucci | 429/231.95 |
| 2010/0178556 A1* | 7/2010 | Manev et al. | 429/199 |

FOREIGN PATENT DOCUMENTS

| | | |
|---|---|---|
| JP | 2002-289194 | 10/2002 |

OTHER PUBLICATIONS

Abe,Y., E. Matsui and M. Senna."Preparation of phase pure and well-crystallized Li4Ti5O12 nanoparticles by precision control of starting mixture and calcining at lowest possible temperatures." Journal of Physics and Chemistry of Solids, vol. 68 (2007), Issues 5-6, pp. 681-686.*

Korean Office Action issued by KIPO, dated Jan. 21, 2011, corresponding to Korean Patent Application No. 10-2009-0003505, together with Request for Entry.

Gao, Jian, Changyin Jiang, Jierong Ying and Chunrong Wan. "Preparation and characterization of high-density spherical Li4Ti5O12 anode material for lithium secondary batteries." Journal of Power Sources vol. 155 (2006), Issue 2, pp. 364-367, which was cited in the Korean Office Action issued by KIPO, dated Jan. 21, 2011, corresponding to Korean Patent Application No. 10-2009-0003505.

Abe, Y., E. Matsui and M. Senna. "Preparation of Phase pure and well-crystallized Li4Ti5O12 nanoparticles by precision control of starting mixture and calcining at lowest possible temperatures." Journal of Physics and Chemistry of Solids vol. 68 (2007), Issues 5-6, pp. 681-686, which was cited in the Korean Office Action issued by KIPO, dated Jan. 21, 2011, corresponding to Korean Patent Application No. 10-2009-0003505.

* cited by examiner

NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CLAIM OF PRIORITY

This application makes reference to, incorporates into this specification the entire contents of, and claims all benefits accruing under 35 U.S.C. §119 from an application earlier filed in the Korean Intellectual Property Office on Jan. 15, 2009, and there duly assigned Serial No. 10-2009-0003505.

BACKGROUND OF THE INVENTION

1. Field of the Invention

The present invention relates to a negative active material for a rechargeable lithium battery, a method of preparing the negative active material, and a rechargeable lithium battery including the negative active material. More particularly, the present invention relates to a negative active material having excellent electrochemical reactivity and high energy density per volume, a method of preparing the same, and a rechargeable lithium battery including the same.

2. Description of the Related Art

Lithium rechargeable batteries have recently drawn attention as a power source of small portable electronic devices. Lithium rechargeable batteries use an organic electrolyte solution and thereby have twice the discharge voltage of a conventional battery using an alkali aqueous solution, and accordingly have high energy density.

For positive active materials of a rechargeable lithium battery, lithium-transition element composite oxides capable of intercalating lithium such as $LiCoO_2$, $LiMn_2O_4$, $LiNiO_2$, $LiNi_{1-x}Co_xO_2$ (0<x<1), and so on, have been researched.

As for negative active materials of a rechargeable lithium battery, various carbon-based materials such as artificial graphite, natural graphite, and hard carbon, which can all intercalate and deintercalate lithium ions, have been used. Since graphite among the carbon-based materials has as low discharge potential as approximately 0.2 V in comparison to lithium, a rechargeable lithium battery using the graphite material having a relatively low discharge potential in comparison to a rechargeable lithium battery using lithium as a negative electrode which shows a high discharge potential at approximately 3.6 V and an excellent energy density characteristic.

Since the graphite negative active material has relatively fine reversibility as well, it is widely used as a power source for small portable electronic devices to provide a rechargeable lithium battery with a long cycle-life.

Negative electrode materials that can provide high power output, boosting charge, long cycle-life, and safety that are better than graphite, however, are required as power sources for middle or large-scale electronic devices such as power tools, power supplies for hybrid electric vehicles (HEVs) or electric vehicles (EVs), uninterruptible power supplies (UPSs), stationary power systems and so on.

To solve this problem, recent technology suggests using oxides to fabricate a negative electrode. For example, U.S. Pat. Nos. 5,545,468 and 6,645,673 disclose using lithium titanium oxides as negative active materials.

Contemporary methods for preparing lithium titanium oxides utilize a wet method, such as a sol-gel method and a hydrothermal synthesis method, or a solid-phase method, to acquire spinel-structured lithium titanium oxide.

Since the solid-phase method may reduce manufacturing costs, compared to the wet method, the solid-phase method is mostly used. The solid-phase method, however, leaves some titanium dioxide unreacted when a heat treatment is performed at a low temperature. In case of a heat treatment performed at a high temperature, the solid-phase method produces byproducts and the particle diameter of generated lithium titanium oxide greatly increases, which leads to a deterioration in physical properties.

In addition, titanium oxide produced through a contemporary preparation method is a porous agglomeration including nano particles. Since the density is very low, energy density per volume decreases.

SUMMARY OF THE INVENTION

It is therefore an object of the present invention to provide an improved negative active material for a rechargeable lithium battery.

It is another object to provide a negative active material for a rechargeable lithium battery having excellent electrochemical reactivity and high energy density per volume.

It is still another object to provide an improved method of preparing the negative active material.

It is yet another object to provide an improved negative electrode including the negative active material.

It is a further object to provide a rechargeable lithium battery including the negative electrode.

Embodiments of the present invention are not limited to the above technical purposes, and a person of ordinary skill in the art can understand other technical purposes.

According to one embodiment of the present invention, a negative active material for a rechargeable lithium battery includes lithium titanium oxide represented by the following Formula 1, and the lithium titanium oxide has a tap density within a range of approximately 1.2 g/cc to 2.2 g/cc.

$$Li_xTi_yO_z$$ [Chemical Formula 1]

wherein $0.1 \leq x \leq 4$, $1 \leq y \leq 5$, and $2 \leq z \leq 12$.

According to another embodiment of the present invention, a method for preparing a negative active material for a rechargeable lithium battery contemplates preparing a lithium titanium oxide precursor represented by Formula 1 by mixing a titanium source and a lithium source through a mechano-chemical treatment, crushing the lithium titanium oxide precursor, and preparing a lithium titanium oxide by performing heat treatment on the crushed lithium titanium oxide precursor at a temperature within a range of approximately 650° C. to 775° C.

According to another embodiment of the present invention, a negative active material for a rechargeable lithium battery includes lithium titanium oxide represented by the following Formula 1, wherein the lithium titanium oxide has a tap density within a range of 1.2 to 2.0 g/cc.

According to yet another embodiment of the present invention, a rechargeable lithium battery includes the above-fabricated negative electrode, a positive electrode including a positive active material, and an electrolyte.

Hereinafter, further embodiments of the present invention will be described in detail.

The present invention provides a simple and low-cost solid-phase method. The solid-phase method may provide lithium titanium oxide having high crystallinity and tap density. The lithium titanium oxide may be used to fabricate an electrode having excellent electrochemical reactivity and high energy density per volume.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE EMBODIMENTS

Exemplary embodiments of the present invention will hereinafter be described in detail. However, these embodiments are only exemplary, and the present invention is not limited thereto.

The negative active material for a rechargeable lithium battery according to one embodiment of the principles of the present invention includes lithium titanium oxide represented by the following Formula 1:

[Chemical Formula 1]

In the above formula,
$0.1 \leq x \leq 4$, $1 \leq y \leq 5$, and $2 \leq z \leq 12$.

According to an embodiment of the principles of the present invention, the lithium titanium oxide may be $Li_4Ti_5O_{12}$.

Also, the lithium titanium oxide may have a tap density within a range of about 1.2 g/cc (grams per cubit centimeters) or higher, specifically, about 1.2 g/cc to 2.2 g/cc, and more specifically, about 1.5 g/cc to 2.0 g/cc. The tap density refers to the apparent density of a volume of a powder obtained when a receptacle of the power is tapped or vibrated. When the tap density of lithium titanium oxide is higher than 1.2 g/cc, an electrode made from the lithium titanium oxide has fine electrochemical reactivity and high energy density per volume.

Also, the particle diameter (i.e., the primary particle diameter) of the lithium titanium oxide may range from about 20 nm to 700 nm, more specifically, from about 200 nm to 500 nm. When the lithium titanium oxide has a particle diameter of about 20 to 700 nm, the lithium titanium oxide has high tap density. Also, with a minute amount of a conductive material and a binder, it is possible to prepare a slurry and fabricate an electrode plate and to improve an electrochemical characteristic of a battery.

The lithium titanium oxide of the present invention is prepared by homogeneously dispersing a lithium compound in a nano-particle titanium compound through a mechano-chemical treatment, which is a solid-phase method, inducing a diffusion reaction of lithium in the titanium compound, and performing a heat treatment at a low temperature. The prepared lithium titanium oxide has high density and high performance.

A negative active material of the present invention is prepared through the following method.

First, a lithium titanium oxide precursor is prepared by mixing a titanium source with a lithium source through a mechano-chemical treatment.

Herein, the titanium source may be one selected from the group consisting of titanium dioxide ($TiO_2$), solid-phase titanate chloride, solid-phase titanate sulfide, and solid-phase titanate hydroxide.

The titanium dioxide ($TiO_2$) may have a phase of one selected from the group consisting of an anatase crystal phase, a rutile crystal phase, a combination of an anatase crystal phase and a rutile crystal phase, a combination of a brookite crystal phase and a $TiO_2$—B crystal phase, and combinations thereof. Specifically, the titanium dioxide may be of an anatase crystal phase; alternatively, the titanium dioxide may be of a combination of an anatase crystal phase and a rutile crystal phase.

When the titanium dioxide ($TiO_2$) includes a combination of an anatase crystal phase and a rutile crystal phase, the content of the anatase crystal phase may be equal to or higher than 60 wt %. Also, when the titanium dioxide ($TiO_2$) includes a combination of a brookite crystal phase and a $TiO_2$—B (e.g., nano-wire or nanotube) crystal phase, it is possible to synthesize the lithium titanium oxide through a low-temperature reaction.

In addition, the titanium source may have a particle diameter of 200 nm or less, specifically, 50 nm or less, and more specifically, 5 to 50 nm. When the titanium source has a particle diameter of 50 nm or less, it is possible not only to shorten the time for a pre-process by a mechano-chemical treatment and the time for heat treatment, but also to perform the heat treatment at a low temperature. Thus, lithium titanium oxide having a small particle diameter of 500 nm or less can be synthesized.

Also, the titanium source may include a mixture of particles with different particle diameters, or include particles with a bimodal particle diameter distribution. A bimodal distribution refers to a continuous probability distribution with two different modes.

When the titanium source includes particles with different particle diameters, the diameter ratio of small particles to large particles may range from 0.1:1 to 0.4:1, and the volume ratio and the weight ratio of small particles to large particles may range from 0.15:1 to 0.3:1, individually. When the mechano-chemical treatment is performed using the titanium source including particles with the diameter ratio in a range of 0.1:1 to 0.4:1 or with the volume ratio and weight ratio of 0.15:1 to 0.3:1, the two types of particles are mixed and dispersed to thereby produce lithium titanium oxide with densely arranged particles.

The lithium source may include one selected from the group consisting of lithium hydroxide, e.g., LiOH and $LiOH.H_2O$, lithium acetate, e.g., lithium carbonate ($Li_2CO_3$), $LiOOCCH_3$, and $LiOOCCH_3.2H_2O$, a solid-phase lithium source, and combinations thereof.

The mechano-chemical treatment of the present invention may be performed with its operation conditions adjusted according to reaction temperature, reaction time, rotation rate, the amount of a reactant, and so forth. In particular, the mechano-chemical reaction may be performed at a reactor temperature of about 150° C. to 500° C. for about 20 minutes to 60 minutes with a rotation rate of about 5 m/s to 25 m/s. When the mechano-chemical reaction is performed within the above-mentioned ranges, it is easy to control the tap density of the lithium titanium oxide at a high level as suggested in the present invention, to decrease the temperature of heat treatment, and to reduce the time for the heat treatment to thereby increase the throughput per unit process.

The lithium titanium oxide precursor acquired as a condensed phase of nano-particles acquired through the mechano-chemical treatment, is crushed and sieved or classified into particles having a secondary particle size of a desired condensed phase.

The secondary particle size of the desired condensed phase may range from about 5 μm to 50 μm, specifically, from about 10 μm to 20 μm.

Subsequently, heat treatment is performed on the lithium titanium oxide precursor to thereby prepare lithium titanium oxide, which is a negative active material of the present invention.

The heat treatment may be performed at a low temperature ranging from about 650° C. to 775° C., specifically, from about 700° C. to 725° C. When the heat treatment is performed at a temperature between 650° C. and 775° C., the produced lithium titanium oxide may have a nano-sized particle diameter, and little unreacted titanium dioxide impurity appears. Accordingly, it is possible to acquire an electrode with excellent electrochemical reactivity.

The particle diameter of lithium titanium oxide prepared through the mechano-chemical treatment and low-temperature heat treatment may range from about 20 nm to 700 nm, specifically, from 200 nm to 500 nm. When the lithium titanium oxide has a particle diameter of 20 nm to 700 nm, the lithium titanium oxide has high tap density. Also, it is possible to prepare a slurry and fabricate an electrode plate with a minute amount of a conductive material and a binder, and thereby the electrochemical characteristic of a battery is improved.

Also, the lithium titanium oxide has a dense structure where the space between the primary particles is small. The tap density of the lithium titanium oxide may be equal to or higher than 1.2 g/cc, specifically, from 1.2 g/cc to 2.2 g/cc, and more specifically, from 1.5 g/cc to 2.0 g/cc. When the tap density of the lithium titanium oxide is equal to or higher than 1.2 g/cc, it is possible to acquire an electrode with excellent electrochemical reactivity and high energy density per volume.

According to the present invention, it is possible to acquire lithium titanium oxide with high crystallinity and a nano-particle diameter even through the simple solid-phase method. Also, since the space between nano-particles is small, the produced lithium titanium oxide has high tap density. Therefore, it is possible to fabricate an electrode with high energy density per volume.

The present invention also provides a negative electrode including a negative active material prepared according to the above method.

The negative electrode includes the negative active material of the present invention, a conductive material, and a binder. Particularly, the content of the negative active material in the negative electrode may range from 75 wt % to 98 wt %, the content of the conductive material may range from 1 wt % to 15 wt %, and the content of the binder may range from 1 wt % to 10 wt %. More specifically, the content of the negative active material may range from 80 to 94 wt %, the content of the conductive material may range from 3 to 10 wt %, and the content of the binder may range from 3 to 10 wt %.

When the negative electrode is formed of a mixture of the negative active material at 75 to 98 wt %, the conductive material at 1 to 15 wt %, and the binder at 1 to 10 wt %, the fabricated negative electrode may have high energy density per volume.

In addition, the content of the conductive material may be adjusted in the negative electrode of the present invention according to C rate of a battery. The C rate refers to the charging or discharging rate of a cell or battery, which is expressed in terms of the total storage capacity in Ampere-Hour (Ah). A rate of 1 C means transfer of all of the stored energy in one hour; 0.1 C means 10% transfer in one hour, or full transfer in 10 hours; 5 C means full transfer in 12 minutes. To be specific, when the battery is charged and discharged at less than a 20 C rate (which is a current capacity rate per hour), that is, in a case where target capacity (mAh) is outputted for more than 1/20 hours (3 minutes), the content of the conductive material used in a negative active material layer may be equal to or less than 5 wt %, specifically the content may range from 1 to 4 wt %. When the battery is charged and discharged at a 20 C rate or more (which is a current capacity rate per hour), that is, in a case where target capacity (mAh) is outputted for less than 1/20 hours (3 minutes), the content of the conductive material may range from 6 to 15 wt %, specifically, from 7 to 12 wt %.

Also, when the battery is charged and discharged at less than a 20 C rate, the content of the negative active material used in the negative active material layer may range from 92 to 98 wt %, specifically, from 94 to 96 wt %. When the output power of the battery is equal to or higher than 20 C rate, the content of the negative active material used in the negative active material layer may range from 75 to 86 wt %, specifically, from 80 to 86 wt %.

In particular, the negative electrode may be fabricated by a method of including the negative active material, a conductive material, a binder, and an organic solvent to provide a negative active material composition, and coating the negative active material composition on a current collector.

Examples of the conductive material include natural graphite, artificial graphite, carbon black, acetylene black, ketjen black, hard carbon, soft carbon, a carbon fiber, a metal powder or a metal fiber including copper, nickel, aluminum, or silver, and so on.

Examples of the binder include at least one selected from the group consisting of polyvinyl alcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The current collector may be selected from the group consisting of a copper foil, a nickel foil, a stainless steel foil, a titanium foil, a nickel foam, a copper foam, a polymer substrate coated with a conductive metal, and combinations thereof. Also, aluminum or copper and an aluminum alloy may be used. Specifically, inexpensive and light aluminum may be used.

The negative electrode fabricated above may have a high active mass density of 1.8 g/cc or higher, specifically, 2.0 g/cc or higher, and more specifically, 2.0 to 2.4 g/cc. When the active mass density of the negative electrode is equal to or higher than 1.8 g/cc, an electrode having high energy density per volume and excellent electrochemical reactivity may be fabricated.

Herein, the active mass density signifies the density of the current collector and the negative active material layer formed on the current collector. The active mass density of an electrode is a value obtained by dividing the mass of the components of the electrode (active material, conductive agent, and binder) excluding a current collector in the electrode by the volume of the electrode. The unit of the active mass density is g/cc. Generally, the higher the active mass density of an electrode becomes, the better the battery capacity becomes.

Also, the range of loading level may be adjusted according to C rate of a battery. Loading level is the electrical charge stored in a unit area of the battery, which is expressed in terms of Ampere-hour per square centimeter or Miliampere-hour per square centimeter. To be specific, when the battery is charged and discharged at less than a 20 C rate, an electrode having a loading level of more than 1.5 mAh/cm² may be fabricated. When the battery is charged and discharged at a 20 C rate or more, an electrode of 1.5 mAh/cm² or less may be fabricated.

The present invention provides a rechargeable lithium battery including the negative electrode fabricated as above.

The rechargeable lithium battery may include the negative electrode fabricated according to the embodiments of the principles of the present invention, a positive electrode, and an electrolyte.

The positive electrode includes a current collector and a positive active material layer disposed on the current collector. The positive active material includes lithiated intercalation compounds that reversibly intercalate and deintercalate lithium ions. The positive active material may include a composite oxide including lithium and at least one selected from the group consisting of cobalt, manganese, nickel, and a combination thereof. In particular, the following lithium-containing compounds may be used:

$Li_aA_{1-b}B_bD_2$ (wherein $0.90 \leq a \leq 1.8$ and $0 \leq b \leq 0.5$); $Li_aE_{1-b}B_bO_{2-c}D_c$ (wherein $0.90 \leq a \leq 1.8$, $0 \leq b \leq 0.5$, and $0 \leq c \leq 0.05$); $LiE_{2-b}B_bO_{4-c}D_c$ (wherein $0 \leq b \leq 0.5$ and $0 \leq c \leq 0.05$); $Li_aNi_{1-b-c}Co_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB_cO_{2-\alpha}F_2$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above formulae, A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is selected from the group consisting of Al, Cr, Mn, Fe, Mg, La, Ce, Sr, V, and combinations thereof; Q is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

The lithiated intercalation compound of the positive active material can have a coating layer coated on the surface of the lithiated intercalation compound, or can be mixed with another compound having a coating layer coated on the surface of the another compound. The coating layer may include at least one coating element compound selected from the group consisting of an oxide of a coating element, a hydroxide, an oxyhydroxide of a coating element, an oxycarbonate of a coating element, and a hydroxyl carbonate of a coating element. The coating element compounds for the coating layer may be amorphous or crystalline. The coating element for the coating layer may include Mg, Al, Co, K, Na, Ca, Si, Ti, V, Sn, Ge, Ga, B, As, Zr, or mixtures thereof. The coating layer can be formed in a method having no negative influence on properties of a positive active material by including these elements in the compound. For example, the method may include any coating method such as spray coating, dipping, and the like, but is not illustrated in more detail, since it is well-known to those who work in the related field.

The positive active material layer includes a binder and a conductive material.

The binder of the positive active material layer improves binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material of the positive active material layer improves electrode conductivity. Any electrically conductive material may be used as a conductive material unless it causes a chemical change. Examples of the conductive material include natural graphite, artificial graphite, carbon black, acetylene black, ketjen black, a carbon fiber, a metal powder or a metal fiber including copper, nickel, aluminum, silver, and so on, and a polyphenylene derivative.

The current collector of the positive electrode may be Al, but is not limited thereto.

The positive electrode may be fabricated as follows: a positive active material composition is prepared by mixing the positive active material, a binder, and a conductive agent, and then a current collector is coated with the composition for an active material layer. Since the method of fabricating an electrode is well known in the art to which the present invention pertains, a detailed description thereof will be omitted. The solvent may include N-methylpyrrolidone, but it is not limited thereto.

In the non-aqueous electrolyte rechargeable battery, the non-aqueous electrolyte includes a non-aqueous organic solvent and a lithium salt.

The non-aqueous organic solvent acts as a medium for transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include n-methyl acetate, n-ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone and so on. Examples of the alcohol-based solvent include ethyl alcohol, isopropyl alcohol, and so on, and examples of the aprotic solvent include nitriles such as R—CN (wherein R is a C2 to C20 linear, branched, or cyclic hydrocarbon, a double bond, an aromatic ring, or an ether bond), amides such as dimethylformamide, dioxolanes such as 1,3-dioxolane, sulfolanes, and so on.

The non-aqueous organic solvent may be used singularly or in a mixture. When the organic solvent is used in a mixture, a mixture ratio can be controlled in accordance with a desirable battery performance.

The carbonate-based solvent may include a mixture of a cyclic carbonate and a linear carbonate. The cyclic carbonate and the chain carbonate are mixed together in the volume ratio of 1:1 to 1:9, and when the mixture is used as an electrolyte, the electrolyte performance may be enhanced.

In addition, the electrolyte of the present invention may further include mixtures of carbonate-based solvents and aromatic hydrocarbon-based solvents. The carbonate-based solvents and the aromatic hydrocarbon-based solvents are preferably mixed together in the volume ratio within a range of about 1:1 to 30:1.

The aromatic hydrocarbon-based organic solvent may be represented by the following Formula 2.

[Chemical Formula 2]

In the above Formula 2, $R_1$ to $R_6$ are independently hydrogen, a halogen, a C1 to C10 alkyl, a C1 to C10 haloalkyl, or combinations thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof.

The non-aqueous electrolyte may further include vinylene carbonate or an ethylene carbonate-based compound of the following Formula 3.

[Chemical Formula 3]

In the above Formula 3, $R_7$ and $R_8$ are independently a hydrogen, a halogen, a cyano (CN), a nitro ($NO_2$), and a C1 to C5 fluoroalkyl, provided that at least one of $R_7$ and $R_8$ is a halogen, a nitro ($NO_2$), or a C1 to C5 fluoroalkyl and $R_7$ and $R_8$ are not simultaneously hydrogen.

The ethylene carbonate-based compound includes difluoroethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. The use amount of the additive for improving cycle-life may be adjusted within an appropriate range.

The lithium salt supplies lithium ions in the battery, and operates a basic operation of a rechargeable lithium battery and improves lithium ion transport between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, LiI, and $LiB(C_2O_4)_2$ (lithium bisoxalate borate, LiBOB). The lithium salt may be used at a 0.1 to 2.0M concentration. When the lithium salt is included at the above concentration range, electrolyte performance and lithium ion mobility may be enhanced due to optimal electrolyte conductivity and viscosity.

The rechargeable lithium battery may further include a separator disposed between a negative electrode and a positive electrode, as needed. Non-limiting examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate the present invention in detail. These examples, however, should not in any sense be interpreted as limiting the scope of the present invention.

EXAMPLES

<Fabrication of Negative Active Material>

Example 1

A lithium titanium oxide ($Li_4Ti_5O_{12}$) precursor was prepared by mixing LiOH with titanium dioxide ($TiO_2$) having an average particle size of 30 nm and including about 80 wt % of an anatase crystal phase and about 20 wt % of a rutile crystal phase through a mechano-chemical treatment.

The mechano-chemical treatment was performed by using a mechanofusion system produced by Hosokawa Micron Company at controlled operation conditions, i.e., at a reaction temperature of 150° C. for 20 minutes at a rotation rate of 10 m/s. The tap density was measured by using a tap density measurer, which is Multi-tester MT-1000 (Seishin), according to the ASTM B527 method.

Subsequently, the lithium titanium oxide precursor was crushed and heat treatment was performed at 700° C. at a heating rate of 3° C./min for 6 hours to thereby prepare lithium titanium oxide as a negative active material. The particle diameter of the prepared lithium titanium oxide was 500 nm, and the tap density of the prepared lithium titanium oxide was 1.2 g/cc.

Figure 1:
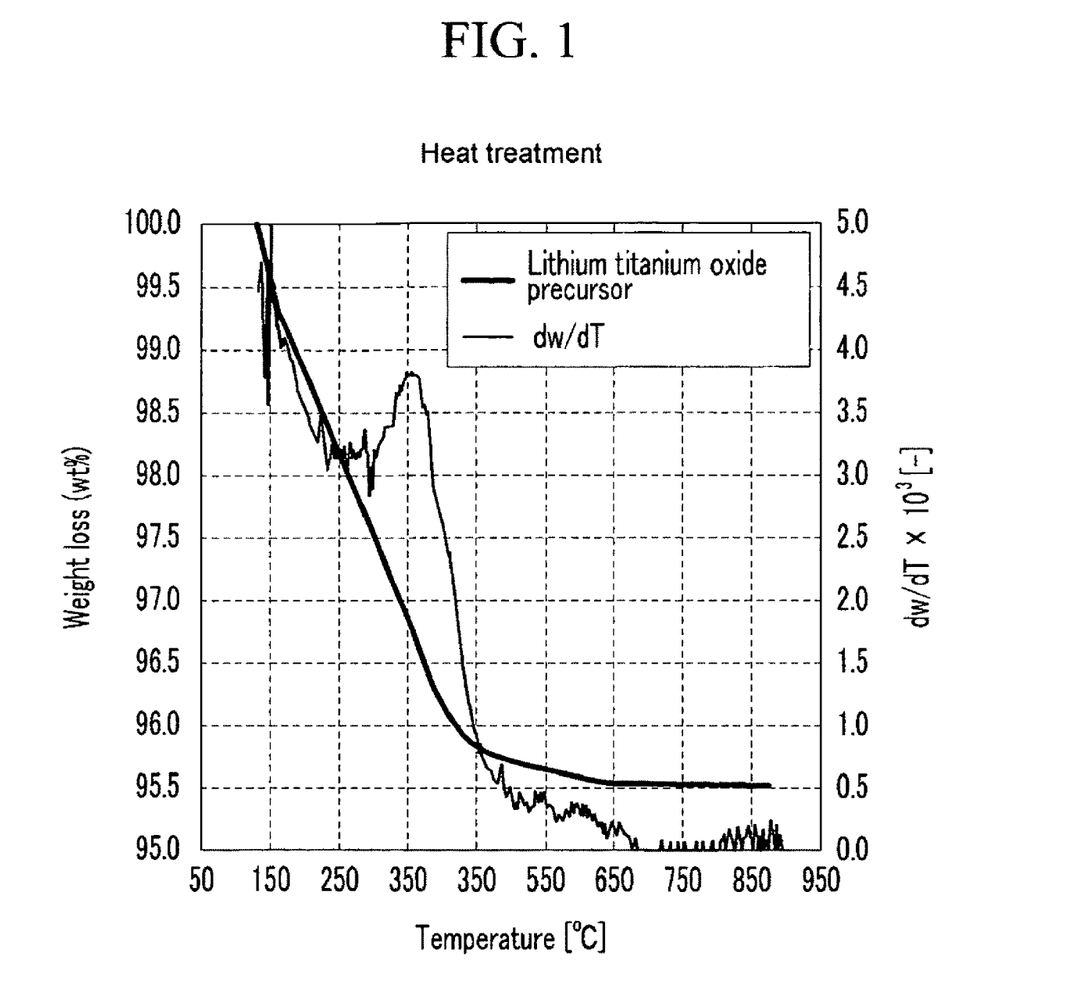
FIG. 1 is a graph showing a thermogravimetric analysis (TGA) result of a lithium titanium oxide precursor prepared according to Example 1 of the principles of the present invention.

FIG. 1 shows a thermogravimetric analysis (TGA) result of the lithium titanium oxide precursor prepared according to Example 1. Thermogravimetric Analysis (TGA) refers to a testing method that is performed on samples to determine changes in weight in relation to changes in temperature. As shown in FIG. 1, the weight of the lithium titanium oxide precursor decreased from a temperature lower than 150° C. until the temperature reached 650° C. At a temperature higher than 650° C., crystallization of lithium titanium oxide was observed.

Example 2

Lithium titanium oxide as a negative active material was prepared according to Example 1, except that the mechano-chemical treatment was performed at a reaction temperature of 300° C. for 40 minutes and at a rotation rate of 15 m/s. The particle diameter of the prepared lithium titanium oxide was 500 nm and the tap density was 1.6 g/cc.

Example 3

Lithium titanium oxide as a negative active material was prepared according to Example 1, except that the mechano-chemical treatment was performed at a reaction temperature of 500° C. for 40 minutes and at a rotation rate of 20 m/s. The particle diameter of the prepared lithium titanium oxide was 500 nm and the tap density was 2.0 g/cc.

Comparative Example 1

Lithium titanium oxide as a negative active material was prepared according to Example 1, except that titanium dioxide ($TiO_2$) and LiOH were simply mixed without performing the mechano-chemical process. The particle diameter of the prepared lithium titanium oxide was 400 nm and the tap density was 0.8 g/cc.

Comparative Example 2

Lithium titanium oxide as a negative active material was prepared according to Example 1, except that when the lithium titanium oxide precursor was prepared, the mechano-chemical treatment was performed at a reaction temperature of 300° C. for 40 minutes and at a rotation rate of 15 m/s, and the heat treatment was performed onto the lithium titanium oxide precursor at 600° C. at a heating rate of 3° C./min for 12 hours. The particle diameter of the prepared lithium titanium oxide was 300 nm and the tap density was 1.1 g/cc.

Comparative Example 3

Lithium titanium oxide as a negative active material was prepared according to Example 1, except that when the lithium titanium oxide precursor was prepared, the mechano-chemical treatment was performed at a reaction temperature of 300° C. for 40 minutes and at a rotation rate of 15 m/s, and the heat treatment was performed onto the lithium titanium oxide precursor at 800° C. at a heating rate of 3° C./min for 6 hours. The particle diameter of the prepared lithium titanium oxide was 1000 nm and the tap density was 2.2 g/cc.

Comparative Example 4

Lithium titanium oxide as a negative active material was prepared according to Example 1, except that when the lithium titanium oxide precursor was prepared, the mechano-chemical treatment was performed at a reaction temperature of 300° C. for 40 minutes and at a rotation rate of 15 m/s, and the heat treatment was performed on the lithium titanium oxide precursor at 900° C. at a heating rate of 3° C./min for 6 hours. The particle diameter of the prepared lithium titanium oxide was 2000 nm and the tap density was 2.2 g/cc.

The tap densities of negative active materials using the lithium titanium oxides prepared according to Examples 1 to 3 and Comparative Examples 1 to 4 are shown in the following Table 1.

TABLE 1

Tap Densities of Negative Active Materials

|  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| Mechano-chemical treatment application | ○ | ○ | ○ | X | ○ | ○ | ○ |
| Heat treatment temperature (° C.) | 700 | 700 | 700 | 700 | 600 | 800 | 900 |
| Tap density of lithium titanium oxide (g/cc) | 1.2 | 1.6 | 2.0 | 0.8 | 1.1 | 2.2 | 2.2 |
| Particle diameter of lithium titanium oxide (nm) | 500 | 500 | 500 | 400 | 300 | 1000 | 2000 |

Experimental Example 1

X-Ray Diffraction (XRD) Analysis of Lithium Titanium Oxide

Figure 2:
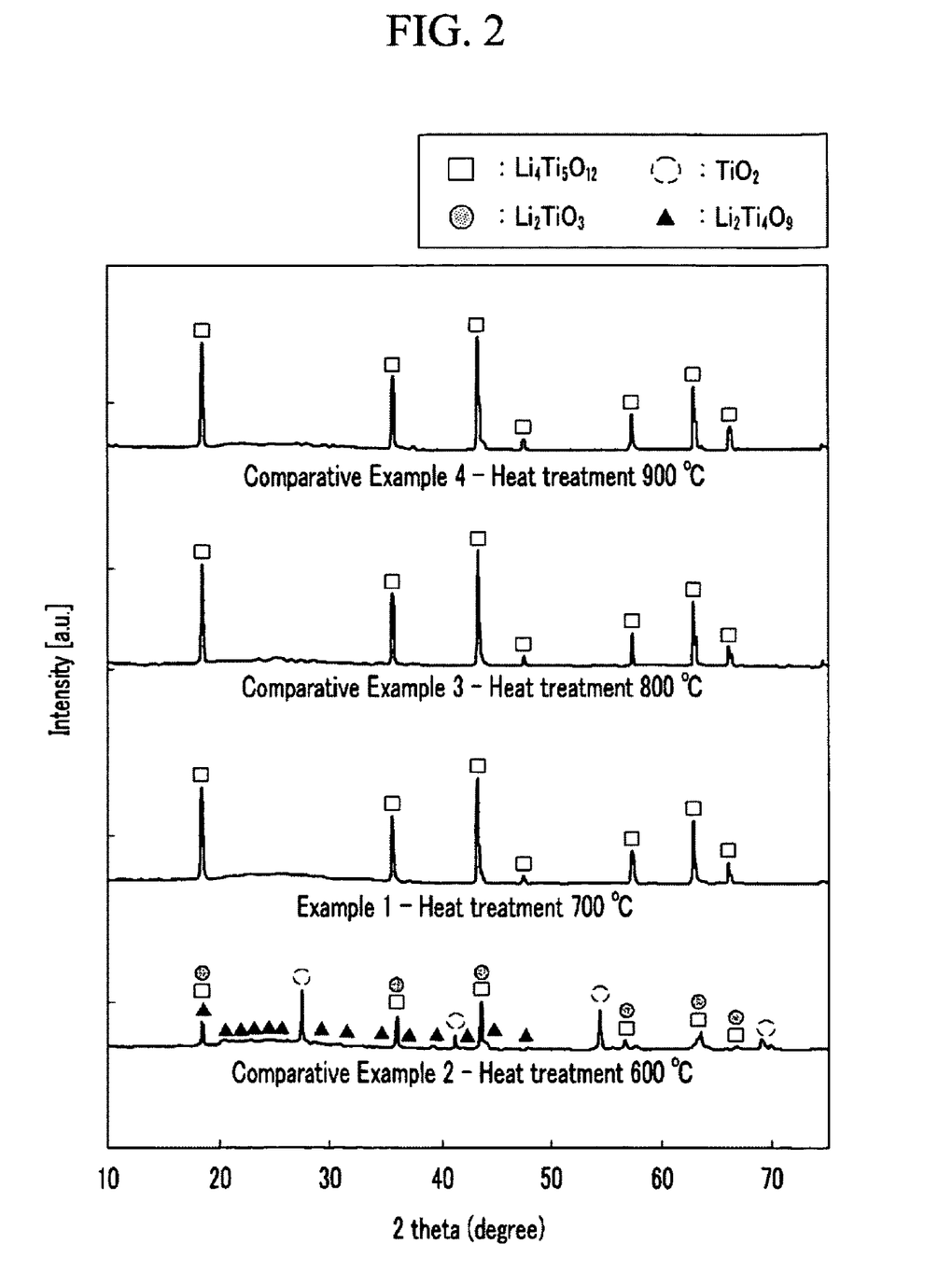
FIG. 2 shows X-ray diffraction (XRD) analysis patterns of lithium titanium oxides prepared according to Example 1 of the present invention and Comparative Examples 2 to 4.

FIG. 2 shows an X-ray diffraction (XRD) analysis result of the lithium titanium oxides prepared according to Example 1 and Comparative Examples 2 to 4.

As shown in FIG. 2, the lithium titanium oxide of Example 1 obtained after heat treatment at 700° C., the lithium titanium oxide of Comparative Example 3 obtained after heat treatment at 800° C., and the lithium titanium oxide of Comparative Example 4 obtained after heat treatment at 900° C. scarcely showed an impurity peak and had the same characteristic peak of lithium titanium oxide, i.e., $Li_4Ti_5O_{12}$.

On the contrary, the lithium titanium oxide of Comparative Example 2 obtained after heat treatment at 600° C. was observed to have a considerable amount of impurity such as unreacted titanium dioxide $TiO_2$, and the lithium titanium oxide of Comparative Example 2 obtained after heat treatment at 600° C. was observed to also have other lithium titanium oxides such as $Li_2TiO_3$ and $Li_2Ti_4O_9$.

Experimental Example 2

Scanning Electron Microscope (SEM) Measurement of Lithium Titanium Oxide

FIGS. 3A to 3D show scanning electron microscope (SEM) photographs of the lithium titanium oxides prepared according to Example 1 and Comparative Examples 2 to 4, respectively.

Figure 3A:
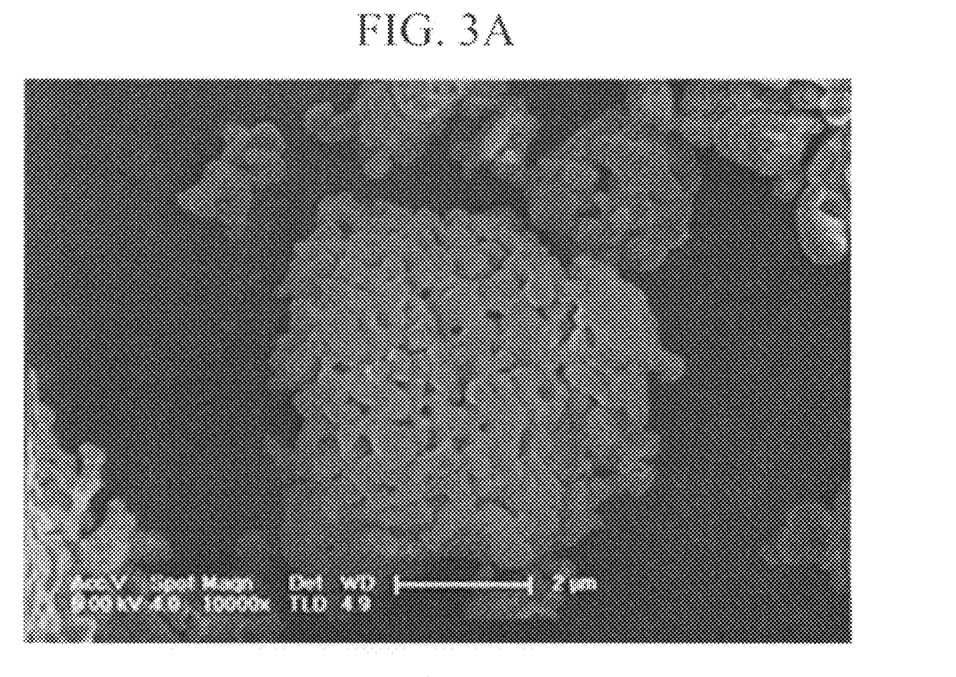
FIGS. 3A to 3D show scanning electron microscopic (SEM) photographs of the lithium titanium oxides prepared according to Example 1 of the present invention and Comparative Examples 2 to 4, respectively.

As shown in FIG. 3A, the lithium titanium oxide of Example 1 prepared after heat treatment at 700° C. had a particle diameter of about 500 nm.

Figure 3B:
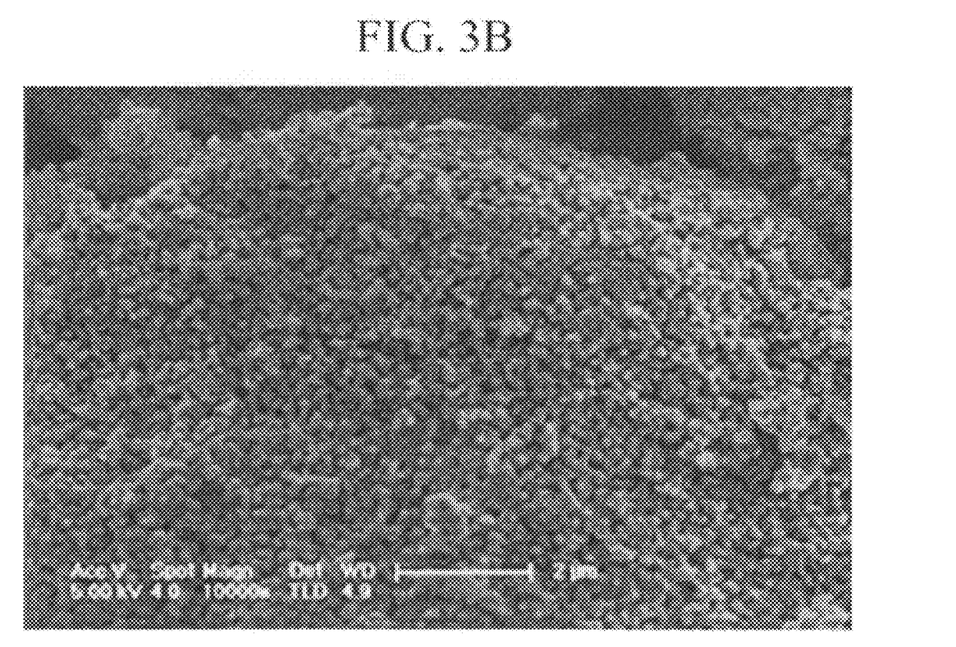

On the contrary, the lithium titanium oxide of Comparative Example 2 prepared after heat treatment at 600° C. had a relatively smaller particle diameter of 300 nm.

Figure 3C:
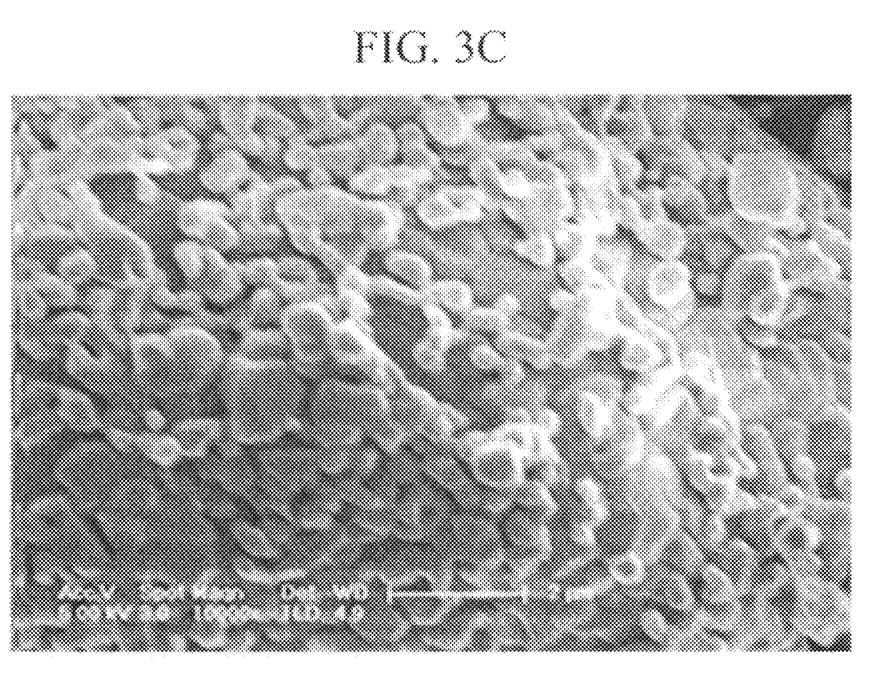
Figure 3D:
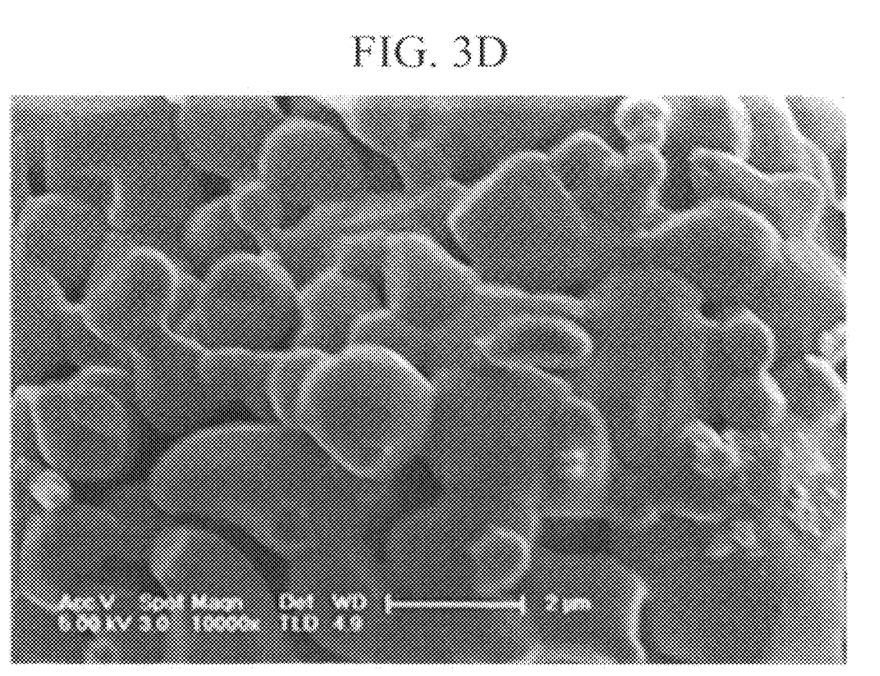

Also, the lithium titanium oxides of Comparative Examples 3 and 4 prepared after heat treatment at 800° C. and 900° C., respectively, had an overly grown particle diameter of 1 to 2 μm.

<Fabrication of Negative Electrode and Rechargeable Lithium Battery Including the Same>

Example 4

A negative active material slurry was prepared by mixing 80 wt % of lithium titanium oxide prepared according to Example 1 as a negative active material, 10 wt % of carbon black, and 10 wt % of polyvinylidene fluoride in N-methyl pyrrolidone. A negative electrode was fabricated by evenly applying the prepared negative active material slurry to aluminum foil to a thickness of 20 μm, drying the aluminum foil coated with the negative active material slurry, and roll-pressing the aluminum foil coated with the negative active material slurry. The active mass density of the fabricated negative electrode was 1.8 g/cc.

A half-cell was fabricated by using a contemporary method of including a counter electrode made from lithium (Li) metal, the prepared negative electrode, and an electrolyte solution.

Example 5

A half-cell was fabricated according to Example 4, except that the negative electrode was fabricated using the negative active material prepared according to Example 2. The active mass density of the fabricated negative electrode was 2.0 g/cc.

Example 6

A half-cell was fabricated according to Example 4, except that the negative electrode was fabricated using the negative active material prepared according to Example 3. The active mass density of the fabricated negative electrode was 2.1 g/cc.

Example 7

A half-cell was fabricated according to Example 4, except that the negative electrode was fabricated by mixing 90 wt % of the negative active material prepared according to Example 3, 5 wt % of a carbon black conductive material, and 5 wt % of a PVdF binder. The active mass density of the fabricated negative electrode was 2.4 g/cc.

Comparative Example 5

A half-cell was fabricated according to Example 4, except that the negative electrode was fabricated using the negative active material prepared according to Comparative Example 1. The active mass density of the fabricated negative electrode was 1.5 g/cc.

Comparative Example 6

A half-cell was fabricated according to Example 4, except that the negative electrode was fabricated using the negative active material prepared according to Comparative Example 2. The active mass density of the fabricated negative electrode was 1.7 g/cc.

Comparative Example 7

A half-cell was fabricated according to Example 4, except that the negative electrode was fabricated using the negative active material prepared according to Comparative Example 3. The active mass density of the fabricated negative electrode was 2.2 g/cc.

Comparative Example 8

A half-cell was fabricated according to Example 4, except that the negative electrode was fabricated using the negative active material prepared according to Comparative Example 4. The active mass density of the fabricated negative electrode was 2.2 g/cc.

The active mass densities of the negative electrodes fabricated according to Examples 4 to 7 and Comparative Examples 5 to 8 are summarized in the following Table 2.

TABLE 2

| | | \multicolumn{8}{c}{Active Mass Densities Of Negative Electrodes} |
|---|---|---|---|---|---|---|---|---|---|
| | | Ex. 4 | Ex. 5 | Ex. 6 | Ex. 7 | Comp. Ex. 5 | Comp. Ex. 6 | Comp. Ex. 7 | Comp. Ex. 8 |
| Composition of negative electrode | Negative active material (wt %) | 80 | 80 | 80 | 90 | 80 | 80 | 80 | 80 |
| | Conductive material (wt %) | 10 | 10 | 10 | 5 | 10 | 10 | 10 | 10 |
| | Binder (wt %) | 10 | 10 | 10 | 5 | 10 | 10 | 10 | 10 |
| Active mass density of negative electrode (g/cc) | | 1.8 | 2.0 | 2.1 | 2.4 | 1.5 | 1.7 | 2.2 | 2.2 |

Experimental Example 3

Measurement of Charge and Discharge Characteristics

Electrochemical charge and discharge characteristics of the rechargeable lithium batteries fabricated according to Examples 4 to 7 and Comparative Examples 5 to 8 were measured by performing charge and discharge once at 0.5 C.

Figure 4:
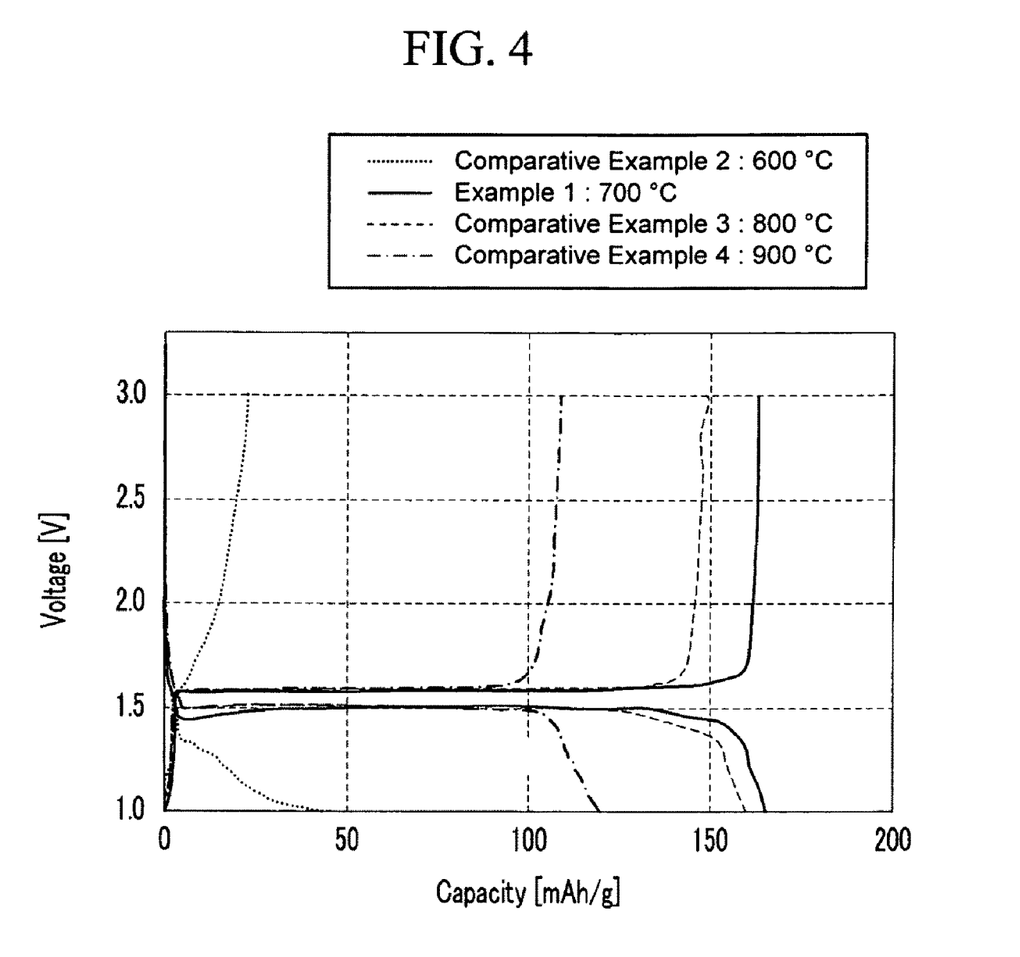
FIG. 4 is a graph showing charge and discharge characteristics of the lithium titanium oxides prepared according to Example 1 of the present invention and Comparative Examples 2 to 4.

FIG. 4 is a graph showing charge and discharge characteristics of the lithium titanium oxides prepared according to Example 1 of the present invention and Comparative Examples 2 to 4.

As shown in FIG. 4, the lithium titanium oxide prepared by using a heat treatment at 700° C. according to Example 1 showed a superior electrochemical characteristic.

Experimental Example 4

Measurement of Loading Level according to C Rate

As for the rechargeable lithium battery fabricated according to Example 4, an experiment was performed to determine a loading level appropriate to C rate.

Figure 5:
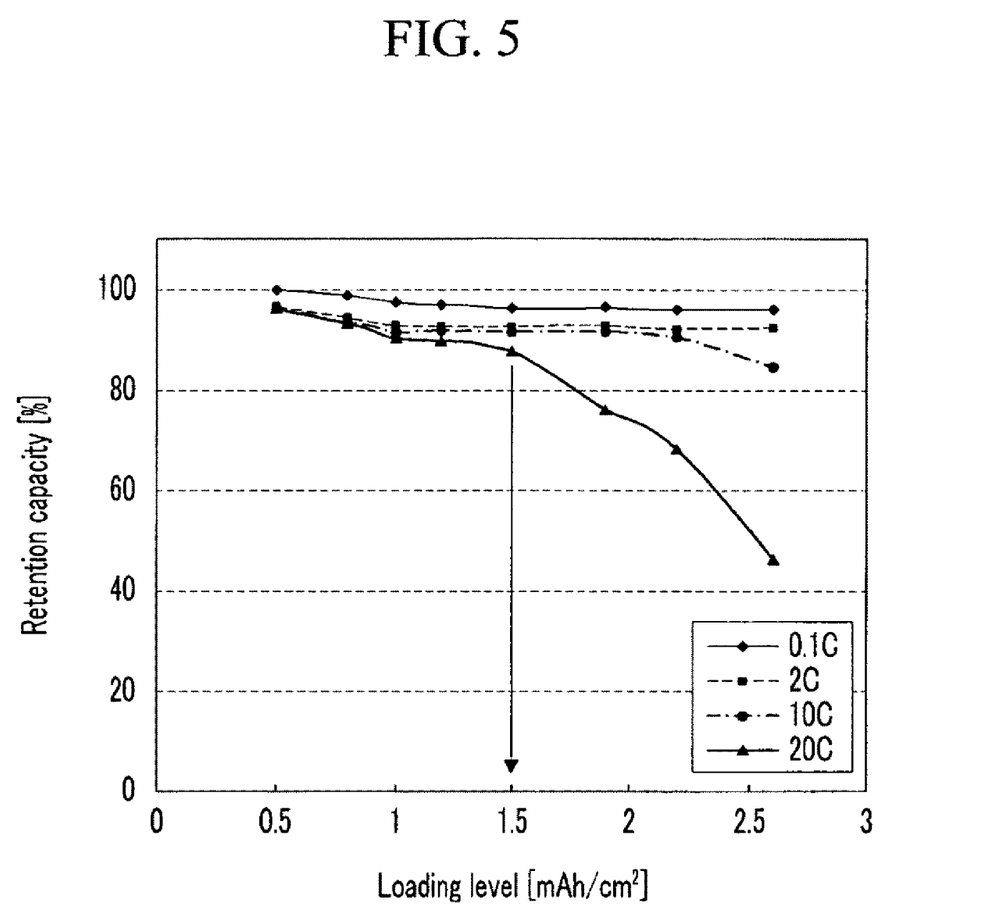
FIG. 5 is a graph showing retention capacities as a function of loading level of a rechargeable lithium battery prepared according to Example 4 of the principles of the present invention according to C rate.

FIG. 5 is a graph showing retention capacities as a function of loading level of a rechargeable lithium battery of Example 4 for different C rate. The retention capacity of a battery refers to the amount of electric charge that the battery can retain after a certain period of charging/discharging of the battery, with respect to the original electric charge that the battery has.

It can be seen from FIG. 5 that the retention capacity decreases as the loading level increases. In particular, the retention capacity decreases remarkably according to the increase of the loading level when the battery is charged and discharged at a 20 C rate. This indicates that when the battery is charged and discharged at less than a 20 C rate, an electrode with a loading level of more than 1.5 mAh/cm² may be used. When the battery is charged and discharged at 20 C rate or more, an electrode with a loading level of 1.5 mAh/cm² or less may be used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A negative active material for a rechargeable lithium battery, comprising:
lithium titanium oxide represented by the following Formula 1,
wherein the lithium titanium oxide has a tap density within a range of approximately 1.2 g/cc to 2.2 g/cc, and a particle diameter within a range of approximately 200 nm to 500 nm:

$$Li_xTi_yO_z \quad \text{[Chemical Formula 1]}$$

wherein, in the above formula,
$0.1 \leq x \leq 4$, $1 \leq y \leq 5$, and $2 \leq z \leq 12$.

2. The negative active material of claim 1, wherein the lithium titanium oxide comprises $Li_4Ti_5O_{12}$.

3. A method for preparing a negative active material for a rechargeable lithium battery, comprising:
preparing a lithium titanium oxide precursor represented by the following Formula 1 by mixing a titanium source and a lithium source through a mechano-chemical treatment;
crushing the lithium titanium oxide precursor; and
preparing a lithium titanium oxide by performing heat treatment on the crushed lithium titanium oxide precursor at a temperature of 650 to 775° C. wherein the lithium titanium oxide has a tap density within a range of approximately 1.2 g/cc to 2.2 g/cc, and a particle diameter within a range of approximately 200 nm to 500 nm:

$$Li_xTi_yO_z \quad \text{[Chemical Formula 1]}$$

wherein, in the above formula,
$0.1 \leq x \leq 4$, $1 \leq y \leq 5$, and $2 \leq z \leq 12$.

4. The method of claim 3, wherein
the titanium source is one selected from the group consisting of titanium dioxide ($TiO_2$), solid-phase titanate chloride, solid-phase titanate sulfide, and solid-phase titanate hydroxide.

5. The method of claim 3, wherein the lithium source is one selected from the group consisting of lithium hydroxide, lithium carbonate, lithium acetate, a solid-phase lithium source, and combinations thereof.

6. The method of claim 4, wherein the lithium titanium oxide comprises $Li_4Ti_5O_{12}$.

7. The method of claim 4, wherein the titanium source has a particle diameter of 200 nm or less.

8. The method of claim 5, wherein the phase of the titanium dioxide ($TiO_2$) is one selected from the group consisting of an anatase crystal phase, a rutile crystal phase, a combination of an anatase crystal phase and a rutile crystal phase, a combination of a brookite crystal phase and a $TiO_2$—B crystal phase, and combinations thereof.

9. The method of claim 4, wherein the mechano-chemical treatment is performed at a reactor temperature within a range of approximately 150° C. to 500° C. for a reaction time within a range of approximately 20 minutes to 60 minutes at a rotation rate within a range of approximately 5 m/s to 25 m/s.

10. A negative electrode for rechargeable lithium battery, comprising:
a negative active material comprising lithium titanium oxide represented by the following Formula 1 and having a tap density of 1.2 to 2.2 g/cc, and having a particle diameter within a range of approximately 200 nm to 500 nm:

$$Li_xTi_yO_z \quad \text{[Chemical Formula 1]}$$

wherein, in the above formula,
$0.1 \leq x \leq 4$, $1 \leq y \leq 5$, and $2 \leq z \leq 12$
a conductive material; and
a binder.

11. The negative electrode of claim 10, wherein the negative electrode comprises 75 to 98 wt % of the negative active material, 1 to 15 wt % of the conductive material, and 1 to 10 wt % of the binder.

12. The negative electrode of claim 10, wherein the lithium titanium oxide is $Li_4Ti_5O_{12}$.

13. The negative electrode of claim 10, wherein the conductive material comprises one selected from the group consisting of natural graphite, artificial graphite, carbon black, acetylene black, ketjen black, a carbon fiber, and a metal powder or a metal fiber including copper, nickel, aluminum, or silver.

14. The negative electrode of claim 10, wherein the binder comprises one selected from the group consisting of polyvinylalcohol, carboxylmethyl cellulose, hydroxypropyl cellulose, polyvinyl chloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

15. The negative electrode of claim 10, wherein the negative electrode has an active mass density within a range of approximately 1.8 g/cc to 2.4 g/cc.

16. A rechargeable lithium battery, comprising:
a negative electrode comprising a negative active material which comprises lithium titanium oxide represented by the following Formula 1 and having a tap density of 1.2 to 2.2 g/cc, and having a particle diameter within a range of approximately 200 nm to 500 nm:

$Li_xTi_yO_z$ [Chemical Formula 1]

wherein, in the above formula,
$0.1 \leq x \leq 4$, $1 \leq y \leq 5$, and $2 \leq z \leq 12$;
a positive electrode including a positive active material; and
an electrolyte.

17. The rechargeable lithium battery of claim 16, wherein the negative electrode comprises 75 to 98 wt % of the negative active material, 1 to 15 wt % of a conductive material, and 1 to 10 wt % of a binder.

18. The rechargeable lithium battery of claim 16, wherein the lithium titanium oxide is $Li_4Ti_5O_{12}$.

19. The rechargeable lithium battery of claim 17, wherein the conductive material comprises one selected from the group consisting of natural graphite, artificial graphite, carbon black, acetylene black, ketjen black, a carbon fiber, and a metal powder or a metal fiber including copper, nickel, aluminum, or silver.

20. The rechargeable lithium battery of claim 17, wherein the binder comprises one selected from the group consisting of polyvinylalcohol, carboxylmethyl cellulose, hydroxypropyl cellulose, polyvinyl chloride, carboxylated polyvinylchloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon.

21. The rechargeable lithium battery of claim 16, wherein the negative electrode has an active mass density within a range of approximately 1.8 g/cc to 2.4 g/cc.

* * * * *